(12) United States Patent
Mamori et al.

(10) Patent No.: US 6,263,190 B1
(45) Date of Patent: Jul. 17, 2001

(54) MOBILE COMMUNICATION APPARATUS WITH A SECURITY FUNCTION AND A METHOD OF COMMUNICATING WITH A BASE STATION WITH SECURITY

(75) Inventors: Yoshiki Mamori; Shigeru Toyoshima; Hiroyuki Saito, all of Yokohama (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 0 days.

(21) Appl. No.: 08/997,994

(22) Filed: Dec. 24, 1997

(30) Foreign Application Priority Data

Dec. 26, 1996 (JP) .................................................. 8-347304

(51) Int. Cl.[7] .................................................. H04B 17/00
(52) U.S. Cl. .......................................... 455/67.1; 455/423
(58) Field of Search .................................. 455/67.1, 423, 455/587, 569; 73/137; 340/441

(56) References Cited

U.S. PATENT DOCUMENTS

| | | | |
|---|---|---|---|
| 4,731,811 | * | 3/1988 | Dubus ..................................... 379/58 |
| 5,191,312 | * | 3/1993 | Altmann ................................ 340/441 |
| 5,266,922 | * | 11/1993 | Smith et al. .......................... 340/525 |
| 5,301,227 | | 4/1994 | Kamei et al. . |
| 5,379,451 | * | 1/1995 | Nakagoshi et al. .................. 455/54.2 |
| 5,444,761 | | 8/1995 | Nagashima . |
| 5,678,196 | * | 10/1997 | Doyle .................................... 455/54.1 |
| 5,917,430 | * | 6/1999 | Greneker, III et al. .............. 340/905 |
| 5,918,180 | * | 1/1999 | Dimino ................................. 455/456 |
| 5,926,756 | * | 7/1999 | Piosenka et al. ..................... 455/418 |

FOREIGN PATENT DOCUMENTS

| | | |
|---|---|---|
| 04 246925 | 9/1992 | (JP) . |
| 08 033031 | 2/1996 | (JP) . |
| 08 149543 | 6/1996 | (JP) . |

* cited by examiner

*Primary Examiner*—Nguyen T. Vo
*Assistant Examiner*—Naghmeh Mehrpour
(74) *Attorney, Agent, or Firm*—Israel Gopstein

(57) ABSTRACT

A radio communication apparatus has a radio wave signal communication circuit and a speed detection circuit for detecting a speed of the radio communication apparatus relative to the base station from an output of the radio wave signal communication circuit. Various operations for security such as neglecting arrival of a call when the vehicle carrying the radio communication apparatus is in a high speed condition are selectively executed in accordance with the detected speed signal. A method of communicating with a base station with various operations mentioned above is also disclosed.

2 Claims, 7 Drawing Sheets

MOBILE COMMUNICATION APPARATUS WITH A SECURITY FUNCTION AND A METHOD OF COMMUNICATING WITH A BASE STATION WITH SECURITY

BACKGROUND OF THE INVENTION

1. Field of the Invention

This invention relates to a mobile communication apparatus with a security function and a method of communicating with a base station with security.

2. Description of the Prior Art

A mobile communication apparatus is known, which can receive a call from a base station and can transmit a call from the base station while it moves. A mobile communication apparatus having a paging function is also known.

SUMMARY OF THE INVENTION

The aim of the present invention is to provide an improved mobile communication apparatus and an improved method of communicating with a base station.

According to the present invention there is provided a radio communication apparatus which comprises: a radio wave signal communication circuit for receiving from and transmitting a radio wave signal to a base station; a communication circuit for providing communication to an operator through the radio wave signal receiving and transmission circuit; a speed detecting circuit for detecting a speed of the radio communication apparatus to the base station from an output of the radio wave signal communication circuit; a comparing circuit for comparing the detected speed with a reference; and a control circuit responsive to the comparing circuit for controlling the communication circuit when the detected speed exceeds the reference.

In the radio communication apparatus, the speed detecting circuit may comprise: a measuring circuit for measuring an electrostatic field intensity of the received radio wave signal in response to a timing signal; a storing circuit for repeatedly storing recent predetermined sets of output data from the measuring circuit; a variation detection circuit for detecting a variation in the recent predetermined sets of output data to generate a speed signal from the detected variation; and a timing control circuit for generating a timing signal in accordance with the speed signal.

In the radio communication apparatus, the communication circuit may further comprise a call detection circuit for detecting a call from the base station via the radio wave signal communication circuit, wherein the control circuit neglects the detected call when the detected speed exceeds the reference.

In the radio communication apparatus, the communication circuit may further comprise an operation circuit for receiving a dialing operation to make a call to the base station via the radio wave signal communication circuit, wherein the control circuit inhibits the communication circuit from making the call when the detected speed exceeds the reference.

In the radio communication apparatus, the communication circuit may further comprise a sound alarming circuit for generating an alarming sound, wherein the control circuit operates the sound alarming circuit to generate the alarming sound when the detected speed exceeds the reference. In this case, the sound alarming circuit may further comprise a sound message storing circuit for storing a predetermined sound alarming message data, wherein the control circuit reads and reproduces the predetermined sound alarming message data by the speaker when the detected speed exceeds the reference.

In the radio communication apparatus, the communication circuit may further comprise a character data storing circuit for storing a predetermined character alarming message data and a display, wherein the control circuit reads and displays the predetermined character alarming message data on the display when the detected speed exceeds the reference.

In the radio communication apparatus, the communication circuit may comprise a message storing circuit for storing message and call detection circuit for detecting a call from the base station and the control circuit reads and transmits the predetermined message to a caller of the call via the base station when the detected speed exceeds the reference.

In the radio communication apparatus, the communication circuit may comprise a vibrator for vibrating a housing of the radio communication apparatus, wherein the control circuit operates the vibrator to provide vibrations of the housing to the bearer of radio communication apparatus when the detected speed exceeds the reference.

In the radio communication apparatus, the communication circuit may comprise a call detection circuit for detecting a call from the base station and a buzzer for informing the user of the detected call, wherein the control circuit controls a sound intensity of a sound from the buzzer when the detected speed exceeds the reference.

In the radio communication apparatus, the communication circuit may comprise a call detection circuit for detecting a call from the base station and automatic answering circuit, having a memory, for transmitting a predetermined out-going message through the radio wave signal communication circuit and recording a message from the base station and the control circuit operates the automatic answering circuit to record the massage from the caller in response to the detected call when the detected speed exceeds the reference.

In the radio communication apparatus, the communication circuit may comprise a paging signal detection circuit for detecting a paging signal including a message from the radio wave signal from the base station and storing circuit, wherein the control circuit stores the message in storing circuit when the detected speed exceeds the reference.

In the radio communication apparatus, the communication circuit may comprise a call detection circuit for detecting a call from the base station and sound processing circuit including first amplifier for receiving and amplifying a first sound from an operator with a first gain and second amplifier for amplifying a sound signal from the base station with a second gain, wherein the control circuit increases first and second gains to provide a hands-free communication to the operator in response to the detected call when the detected speed exceeds the reference.

In the radio communication apparatus, the communication circuit may comprise a call detection circuit for detecting a call from the base station, a storing circuit, a telephone number data detection circuit for detecting telephone number data from the received radio wave signal, and a one-touch dialing circuit having a one-touch dial key, wherein the control circuit operates the telephone number data detection circuit in response to the detected call when the detected speed exceeds the reference and stores the detected telephone number data in the storing circuit and in response to an operation the one-touch dialing key, the control circuit operates the communication circuit to transmit a dialing signal using the telephone number data from the storing circuit.

In the radio communication apparatus, the communication circuit may comprise a call detection circuit for detecting a call from the base station, a character data storing circuit for storing character message data, a character data sending circuit for sending the character message data from the character data storing circuit to the base station through the radio wave signal communication circuit, wherein the control circuit reads the character message data and operates the character data sending circuit to send the read character message data to the base station in response to the detected call when the detected speed exceeds the reference.

In the radio communication apparatus, the communication circuit may further comprise a call detection circuit for detecting a call from the base station, a sound message storing circuit for storing sound message data, wherein the control circuit reads the sound message data and transmits the read sound message data to base station through the radio wave signal communication circuit in response to the detected call when the detected speed exceeds the reference.

In the radio communication apparatus, the speed detecting circuit may comprise a receiving circuit for receiving a vehicle speed signal to detect the speed of the radio communication apparatus.

According to the present invention there is also provided a method of communicating with a base station comprising the steps of: (a) receiving from and transmitting a radio wave signal to a base station; (b) providing communication to an operator through the step (a); (c) detecting a speed to the base station from the received radio wave signal; (d) comparing the detected speed with a reference; and (e) effecting controlling regarding the communication when the detected speed exceeds the reference.

The method may further comprise the steps of: measuring an electrostatic field intensity of the received radio wave signal in response to a timing signal; repeatedly storing recent predetermined sets of output data of the measured electrostatic field intensities; detecting a variation in the recent predetermined sets of output data to generate a speed signal from the detected variation; and generating a timing signal in accordance with the speed signal.

The method may further comprise the steps of: detecting a call from the base station; and neglecting the detected call when the detected speed exceeds the reference.

The method may further comprise the steps of: receiving a dialing operation to make a call to the base station; and inhibiting making the call when the detected speed exceeds the reference.

The method may further comprise the step of: generating an alarming sound when the detected speed exceeds the reference.

The method may further comprise the step of: storing a predetermined sound alarming message data; and reading and reproducing the predetermined sound alarming message data when the detected speed exceeds the reference.

The method may further comprise the step of: storing a predetermined character alarming message data; and reading and displaying the predetermined character alarming message data when the detected speed exceeds the reference.

The method may further comprise the step of: storing a predetermined message; detecting a call from the base station; and reading and transmitting the predetermined message to a caller of the call via the base station when the detected speed exceeds the reference.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described an embodiment of this invention.

Figure 1:
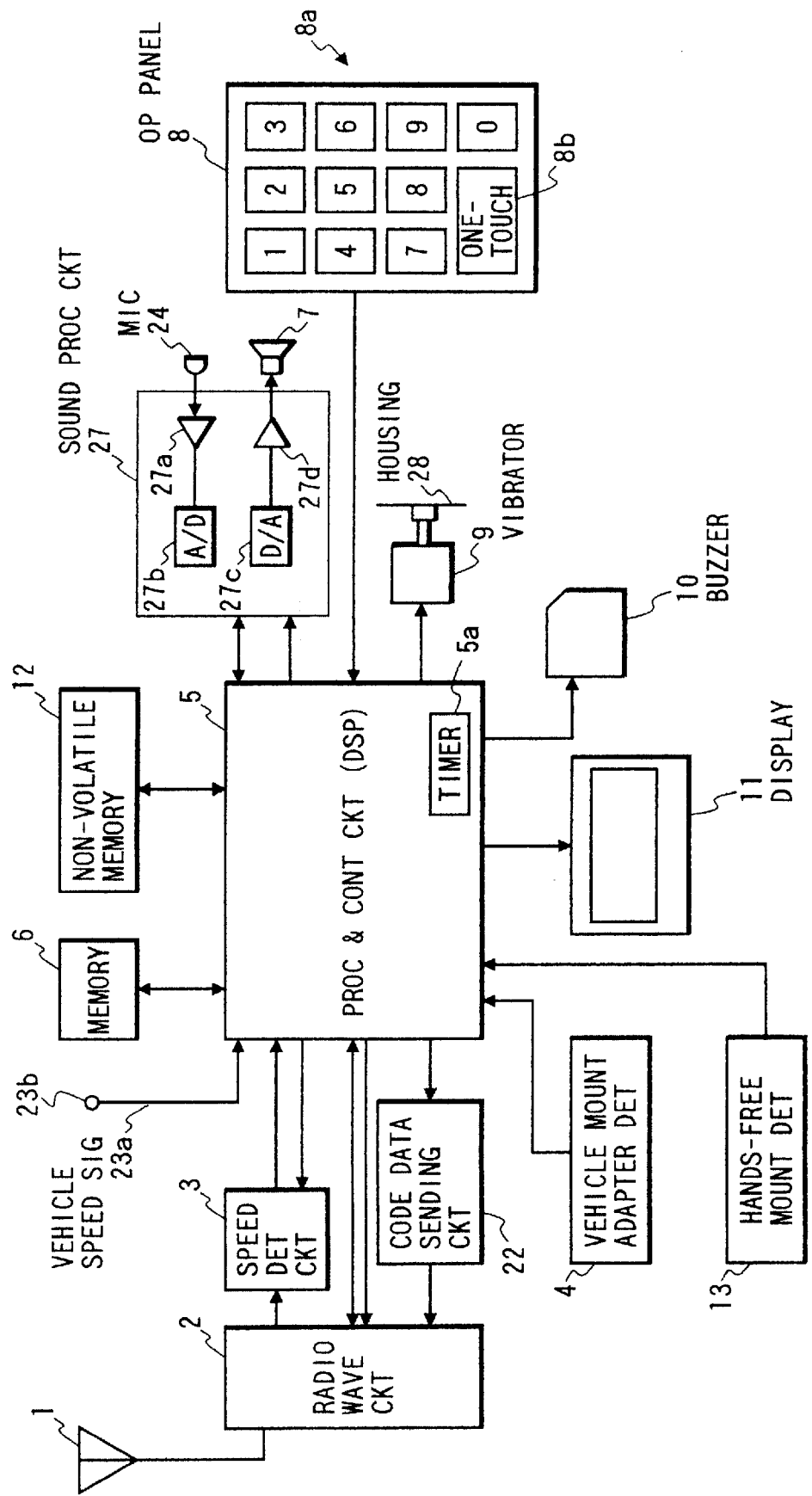
FIG. 1 is a block diagram of a mobile unit communication apparatus of an embodiment of this invention.

FIG. 1 is a block diagram of a mobile unit communication apparatus of the embodiment.

The mobile unit communication apparatus of the first embodiment comprises an antenna 1, a radio wave circuit 2, a speed detection circuit 3, a processing and control circuit (DSP) 5, a sound processing circuit 27, a microphone 24, a speaker 7, an operation panel 8, a vibrator 9, a buzzer 10, a display 11, a hands-free mount detection circuit 13, a vehicle mount adapter detection circuit 4, a code signal sending circuit 22, a memory 6, and a non-volatile memory 12.

The radio wave circuit 2 receives the radio wave signal including a telephone signal and a paging signal from a base station (not shown) and outputs a baseband reception signal from the received the radio wave signal. The processing and control circuit 5 receives the base band reception signal and in response to a call in the base band reception signal operates the vibrator 9 or the buzzer 10 to inform the operator of the arrival of the call and supplies a sound signal to the speaker 7 to reproduce the sound signal for communication through the sound processing circuit 27. The microphone 24 receives the sound from the operator and supplies a second sound signal to the processing and control circuit 5 through the sound processing circuit 27. The processing and control circuit 5 processes the second sound signal and supplies a base band transmission signal. The radio wave circuit 2 transmits the radio wave signal to the base station from the base band transmission signal from the antenna 1. The processing and control circuit 5 generates a dialing signal in response to the ten-keys 8a on the operation panel 8 and a one-touch dialing key 8b. That is, when the operator depresses the one-touch dialing key 8b, the processing and control circuit 5 generates the dialing signal in accordance with telephone number data in the non-volatile memory 12, which was stored in response to the operation of the operation panel 8. The radio wave circuit 2 also transmits the dialing signal through the transmitted radio wave signal.

The non-volatile memory 12 further stores a safety driving flag which is inputted from the operation panel 8 under control of the processing and control circuit 5, telephone number data, a character alarming character message, a sound alarming message in response to the operation by the operator of the operation panel 8 and the microphone 24 under the control of the processing and control circuit 5. The non-volatile memory 12 further stores a paging message and-telephone number data included in the telephone signal and the paging signal in response to the paging signal from the base station under the control of the processing and control circuit 5.

The hands-free mount detector 13 has contacts (not shown) for detecting whether the body of the mobile unit communication apparatus is mounted on a hands-free mount (not shown) and supplies a hands-free mount detection signal to the processing and control circuit 5 when the body of the mobile unit communication apparatus is mounted on the hands-free mount.

The vehicle mount adapter detector 4 has contacts for detecting whether the body of the mobile unit communication apparatus is mounted on a vehicle mount (not shown) and supplies a vehicle mount detection signal to the processing and control circuit 5 when the body of the mobile unit communication apparatus is mounted on the vehicle mount. Moreover, the vehicle mount adapter has a terminal 23b for supplying a vehicle speed signal 23a to the processing and control circuit 5 if the vehicle speed signal 23a is supplied to the terminal 23b.

The code signal generating circuit 22 generates baseband code data for sending it through the radio wave circuit 2 from data from the processing and control circuit 5 such as a character message. The radio wave circuit also transmits the character code signal as the paging signal.

Figure 2:
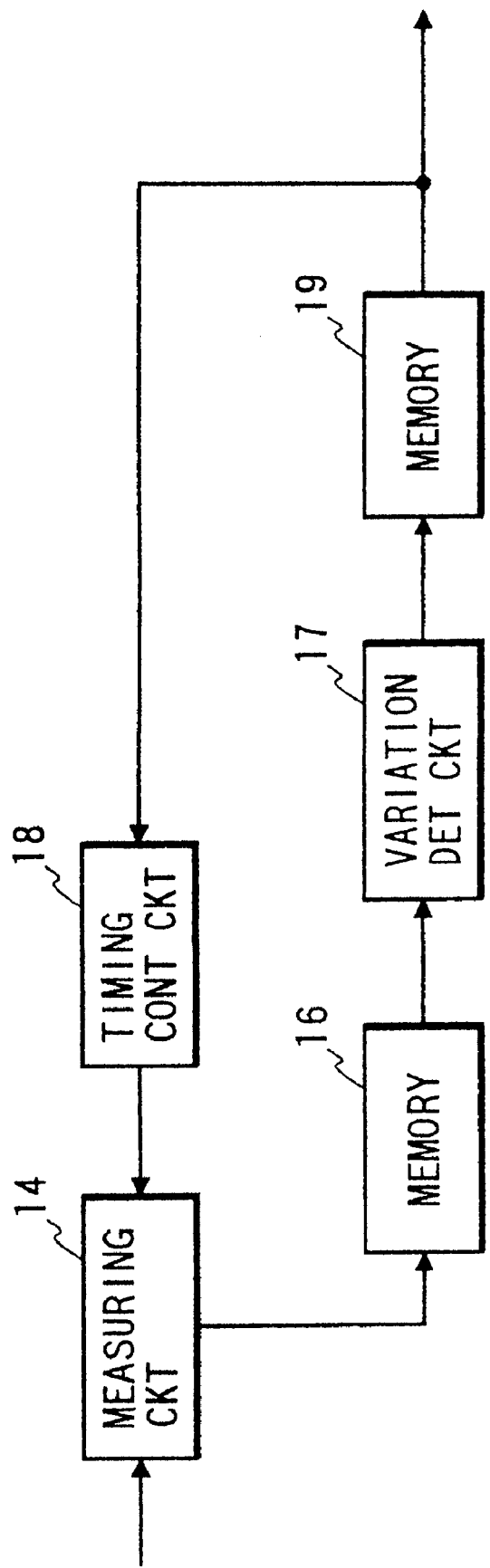
FIG. 2 is a block diagram of the speed detection circuit 3 shown in FIG. 1.

FIG. 2 is a block diagram of the speed detection circuit 3 shown in FIG. 1.

The speed detection circuit 3 comprises a reception electrostatic field intensity measuring circuit 14, a memory 16, a variation detection circuit 17, a memory 19, and a timing control circuit 18.

The reception electrostatic field intensity measuring circuit 14 measures the reception electrostatic field intensity from the output of the radio wave circuit 2 in response to a timing signal from the timing control circuit 18. The memory 16 stores data of the reception electric field intensity. More specifically, the memory 16 repeatedly stores recent predetermined sets of output data from the reception electrostatic field intensity measuring circuit 14. The variation detection circuit 17 detects variations in the recent predetermined sets of output data to determine a fading pitch and generates a speed signal from the detected variation. The timing control circuit 18 generates the timing signal in accordance with the speed signal.

The speed signal is generated by the speed detection circuit 3 by measuring the fading frequency from the variation in the reception electric field intensity as mentioned. However, it is also possible to detect the speed signal from a Doppler shift which occurs between the base station and the mobile unit communication apparatus which moves relative to the base station. Moreover, it is possible to use the vehicle speed signal 23a supplied from the vehicle (not shown) carrying the mobile communication apparatus instead the speed signal from the speed detection circuit 3.

Figure 7:
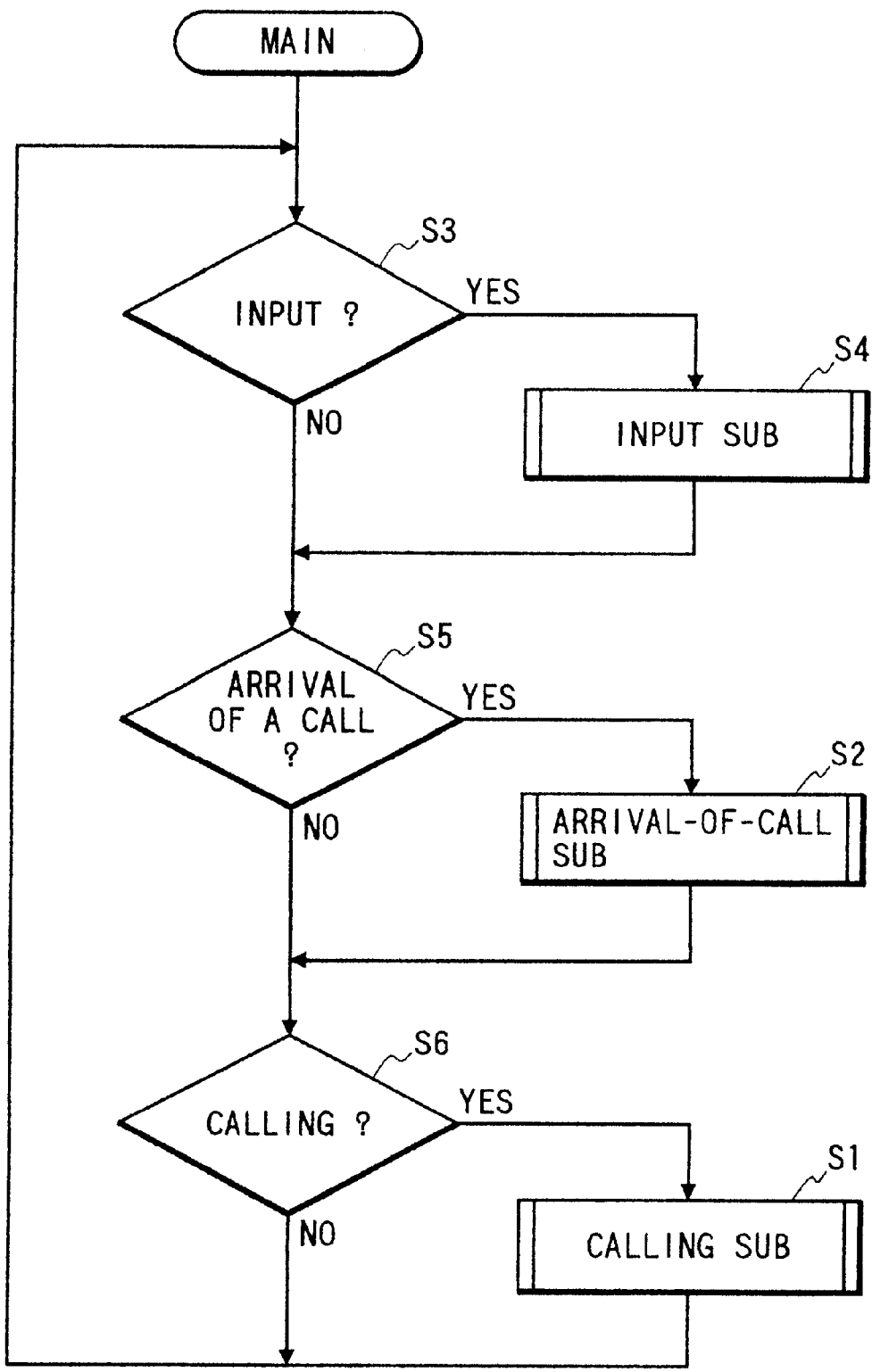
FIG. 7 depicts a flow chart of this embodiment showing a main routine executed by the processing and control circuit shown in FIG. 1.

FIG. 7 depicts a flow chart of this embodiment showing a main routine executed by the processing and control circuit 5.

The processing and control circuit 5 receives an input operation in step s3 and s4. That is, the processing and control circuit 5 receives mode-setting for the security such as a call neglecting mode, a sound alarming message mode, a character alarming message mode, an alarming sound mode, transmitting sound and character message modes, an automatic answering mode, a vibrator mode, a paging mode, a receiving character message mode, a telephone number detecting mode, and a line hold mode and stores corresponding flags in the non-volatile memory 12.

Moreover, the processing and control circuit 5 receives a decreasing sound level of alarming mode, that is, a manner mode, a sound alarming message mode, a character alarming message mode or the like and stores corresponding flags in the non-volatile memory 12.

The processing and control circuit 5 receives a call in steps s5 and s2 and a calling operation in steps s6 and s1 and returns to step s3.

Figure 3:
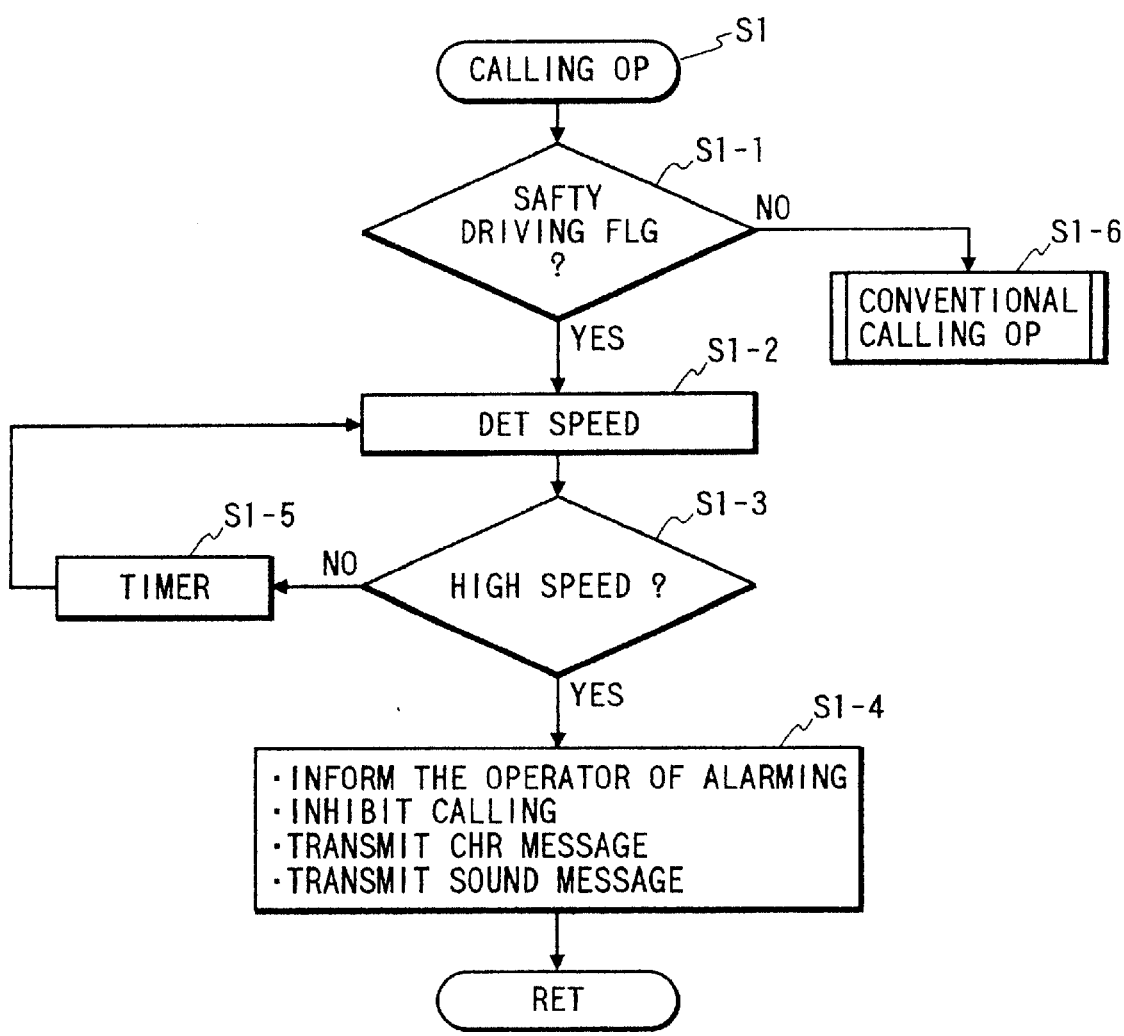
FIG. 3 depicts a flow chart of this embodiment showing a calling operation.

FIG. 3 depicts a flow chart of this embodiment showing the calling operation s1.

The processing and control circuit 5 executes a program as shown in FIG. 3 in response to a calling operation by the operator of the operation panel 8.

In response to the calling operation, the processing and control circuit 5 checks whether the safety driving flag has been set in the non-volatile memory 12 in step s1-1. If the safety driving flag has not been set, the conventional calling operation is executed in step s1-6.

If the safety driving flag has been set, the processing and control circuit 5 operates the speed signal detection circuit 3 and receives the speed signal in step s1-2. The processing and control circuit 5 checks whether the speed signal indicates a high speed by comparing at least a reference. If the speed signal indicates the high speed, the processing and control circuit 5 informs the operator of alarming by the speaker 7, that is a sound alarming message, by the display 11, that is, an alarming character message or flickering a predetermined sign on the display 11, inhibits the actual calling operation, that is, the processing and control circuit 5 neglects the calling demand in step s1-4.

In step s1-4, the processing and control circuit 5 further transmits a character message automatically to the called party determined by the operation of the operation panel 8 if the character message is stored in the non-volatile memory 12 and the corresponding flag has been set in the non-volatile memory 12. Moreover, in step s1-4, the processing and control circuit 5 further transmits a sound message automatically to the called party determined by the operation of the operation panel 8 if the sound message is stored in the non-volatile memory 12 and the corresponding flag has been set.

In step s1-3, if the speed signal does not indicate the high speed, the processing and control circuit 5 operates a timer 5a included therein. When a predetermined interval has passed, processing returns to step s1-2 to detect the speed again and repeats the processing in the loop of the step s1-5, s1-2, s1-3 until the high speed is detected. That is, if the speed of the vehicle increases and reaches the reference high speed, the operations in step s1-4 are executed more surely.

Figure 4:
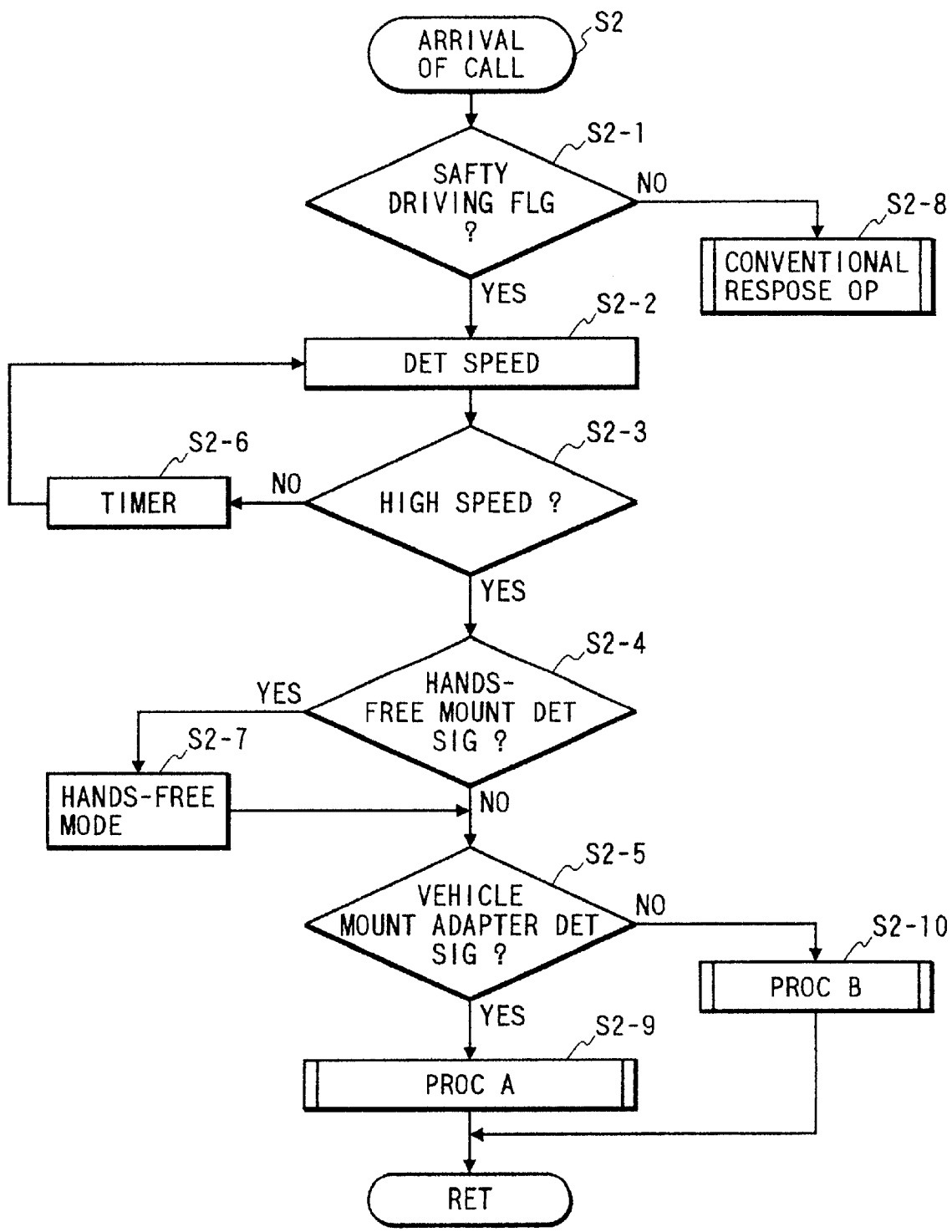
FIG. 4 depicts a flow chart of this embodiment showing a call arrival operation.

FIG. 4 depicts a flow chart of this embodiment showing a call arrival operation.

The processing and control circuit 5 executes a program as shown in FIG. 4 in response to the call from the base station.

In response to the call from the base station, the processing and control circuit 5 checks whether the safety driving flag has been set in the non-volatile memory 12 in step s2-1. If the safety driving flag has not been set, the conventional response operation is executed in step s2-8.

If the safety driving flag has been set, the processing and control circuit 5 operates the speed signal detection circuit 3 and receives the speed signal in step s2-2. The processing and control circuit 5 checks whether the speed signal indicates a high speed by comparing the reference. If the speed signal indicates the high speed, the processing and control circuit 5 checks whether there is the hands-free mount detection signal in step s2-4. If there is the hands-free mount detection signal from the hands-free mount detection circuit 13, the processing and control circuit 5 sets the flag of the hands-free mode. The hand-free mode is a mode of operation in which gains of the amplifier 27a and 27d for the microphone 24 and the receiver 7 are increased. Then, processing proceeds to step s2-5.

If there is no hands-free mount detection signal, processing directly proceeds to step s2-5.

In step s2-5, the processing and control circuit 5 checks whether there is the vehicle mount adapter detection signal in step s2-5 from the vehicle mount adapter detection circuit 4. If there is the vehicle mount adapter detection signal, processing proceeds to a processing A, that is, a subroutine s2-9. If there is not the vehicle mount adapter detection signal, processing proceeds to a processing B, that is, a subroutine s2-10.

Figure 5:
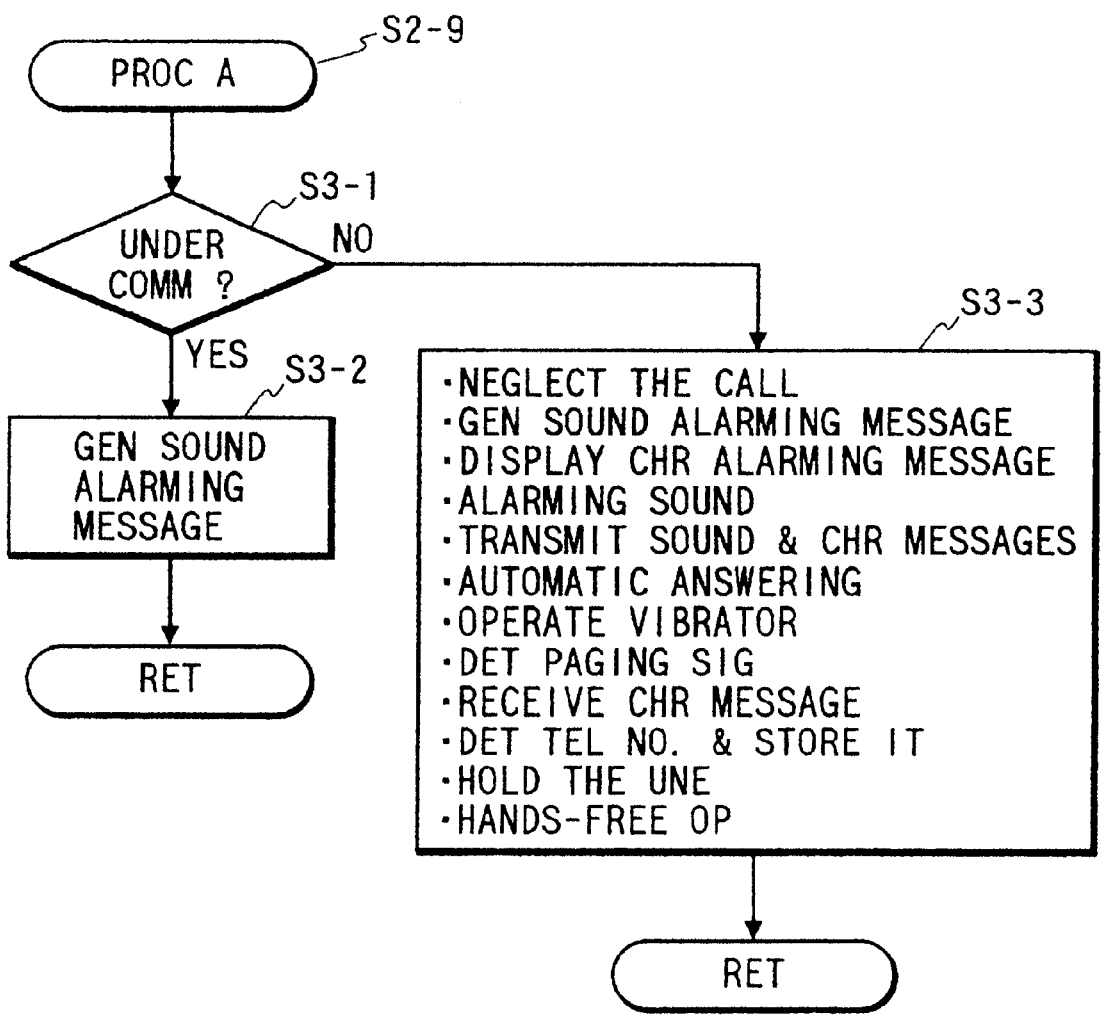
FIG. 5 depicts a flow chart of this embodiment showing the processing A in FIG. 4.

FIG. 5 depicts a flow chart of this embodiment showing the processing A s2-9.

In the processing A s2-9, the processing and control circuit 5 checks whether the operator is communicating in step s3-1. If the operator is communicating, the processing and control circuit 5 generates a sound alarming message.

If the operator is not communicating, in step s3-3 the processing and control circuit 5 executes all of or some of functions in accordance with the flags which have been set from the operation panel 8 in the non-volatile memory 12. The functions are neglecting the call, generating a sound alarming message, displaying a character alarming message, generating an alarming sound, transmitting sound and character messages, effecting automatically answering, operating the vibrator 9, receiving a character message in the paging signal, detecting the telephone number and storing it in the non-volatile memory 12 for one-touch dialing, or holding the line.

Figure 6:
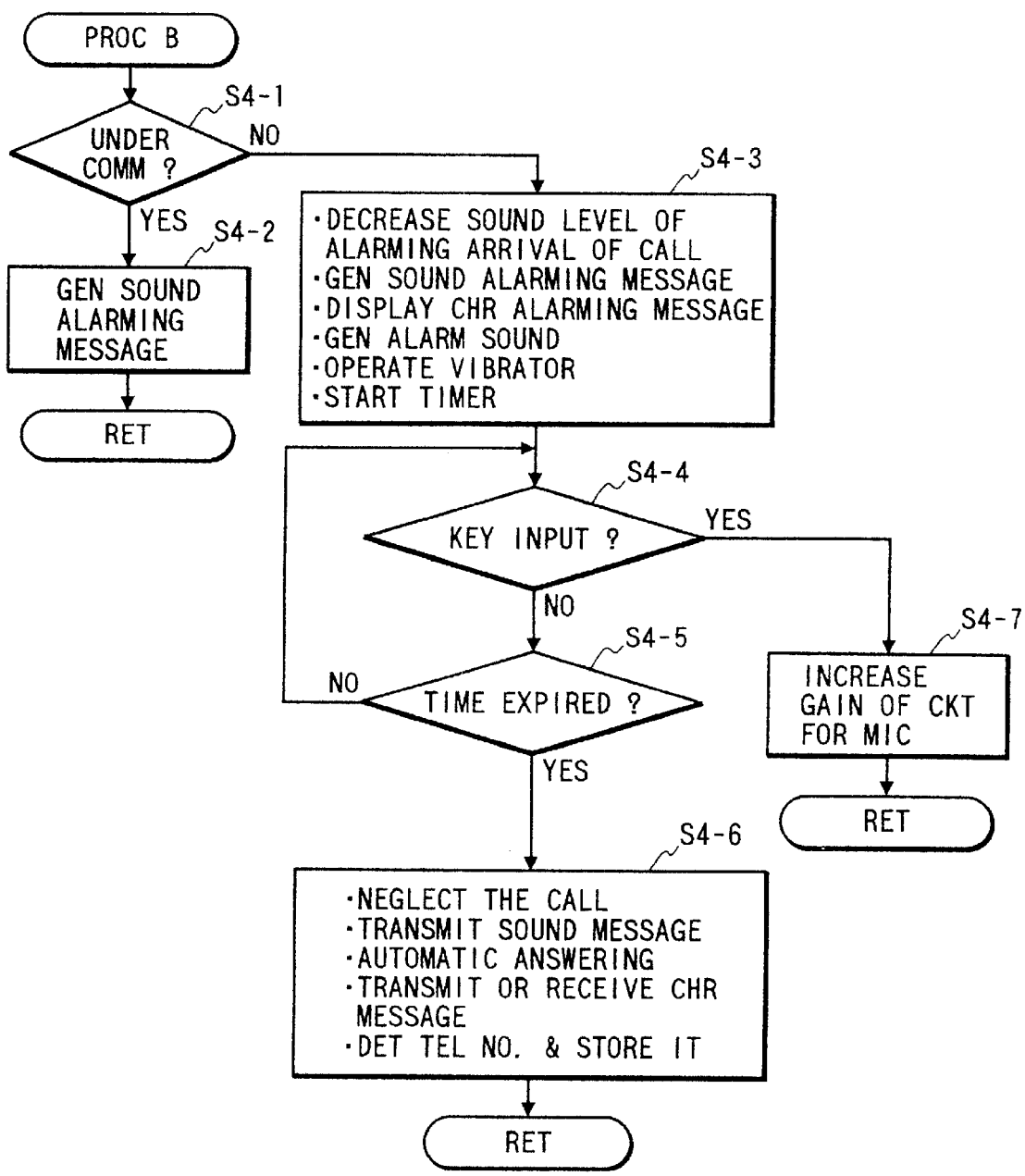
FIG. 6 depicts a flow chart of this embodiment showing the processing B in FIG. 4.

FIG. 6 depicts a flow chart of this embodiment showing the processing B s2-10.

In the processing B s2-10, it is assumed that the operator is getting on a train, a bus, or the like.

In step s4-1, the processing and control circuit 5 checks whether the operator is communicating. If the operator is communicating, the processing and control circuit 5 generates the sound alarming message to the operator in step s4-2.

If the operator is not communicating, in step s4-3, the processing and control circuit 5 executes all of or some of functions in accordance with the flags which have been set from the operation panel 8 in the non-volatile memory 12. The functions are operating the sound processing circuit 27 to decrease the sound level of the alarm informing the arrival of the call, generating the sound alarming message to provide the caution, generating the alarm sound, operating the vibrator.

In step s4-3 the processing and control circuit 5 further operates the timer 5a.

In step s4-4, the processing and control circuit 5 checks whether there is a key input. If there is no key input, the processing and control circuit 5 checks whether the predetermined time interval set in the timer 5a has expired. If the time interval has expired, in step s4-6, the processing and control circuit 5 executes all or some of functions in accordance with the flags in the non-volatile memory 12. The functions are neglecting the call, transmitting the sound message to the caller, effecting an automatic answering operation, transmitting or receiving a character message through the paging signal, detecting the telephone number and storing it in the non-volatile memory 12 for one-touch dialing.

In step s4-4, if there is a key input, the processing and control circuit 5 increases the gain of the microphone 24 by operating the sound processing circuit 27 to decrease a speech level of the operator in step s4-7.

In step s4-4, if there is no key input, the processing and control circuit 5 executes step s4-4 until the predetermined interval set to the timer 5a expires. If the predetermined interval expired, the processing and control circuit 5 effects all of or some of functions such as neglecting the call, transmitting a sound message, automatic answering, transmitting or receiving character message, and detecting the telephone number of the caller and storing it in the non-volatile memory for the one touch dialing in steps s4-6.

In this embodiment, there is only one reference compared with the speed signal. However, the speed may be classified such that a high speed, a middle speed, and a low speed are defined. The security operations in steps s1-4, s3-3. s4-3. s4-6, s4-7 may be executed in accordance with the plurality of classified speeds.

What is claimed is:

1. A radio communication apparatus comprising:

radio wave signal communication means for receiving from and transmitting a radio wave signal to a base station;

communication means for providing communication to an operator through said radio wave signal receiving and transmission means;

speed detecting means for detecting a speed of said radio communication apparatus to said base station from an output of said radio wave signal communication means;

comparing means for comparing the detected speed with a reference; and control means responsive to said comparing means for controlling said communication means when the detected speed exceeds said reference, wherein said communication means comprises call detection means for detecting a call from said base station and sound processing means including first amplifying means for receiving and amplifying a first sound from an operator with a first gain and second amplifying means for amplifying a sound signal from said base station with a second gain, wherein said control means increases first and second gains to provide a hands-free communication to said operator in response to the detected call when the detected speed exceeds said reference.

2. A radio communication apparatus comprising:

radio wave signal communication means for receiving from and transmitting a radio wave signal to a base station;

communication means for providing communication to an operator through said radio wave signal receiving and transmission means;

speed detecting means for detecting a speed of said radio communication apparatus to said base station from an output of said radio wave signal communication means;

comparing means for comparing the detected speed with a reference; and control means responsive to said comparing means for controlling said communication means when the detected speed exceeds said reference, wherein said communication means comprises call detection means for detecting a call from said base station, storing means, telephone number data detection means for detecting telephone number data from the reception radio wave signal, one-touch dialing means having a one-touch dial key, wherein said control means operates said telephone number data detection means in response to the detected call when the detected speed exceeds said reference and stores the detected telephone number data in said storing means and in response to an operation of said one-touch dialing key, said control means operates said communication means to transmit a dialing signal using the telephone number data from said storing means.

* * * * *